Patented June 7, 1938

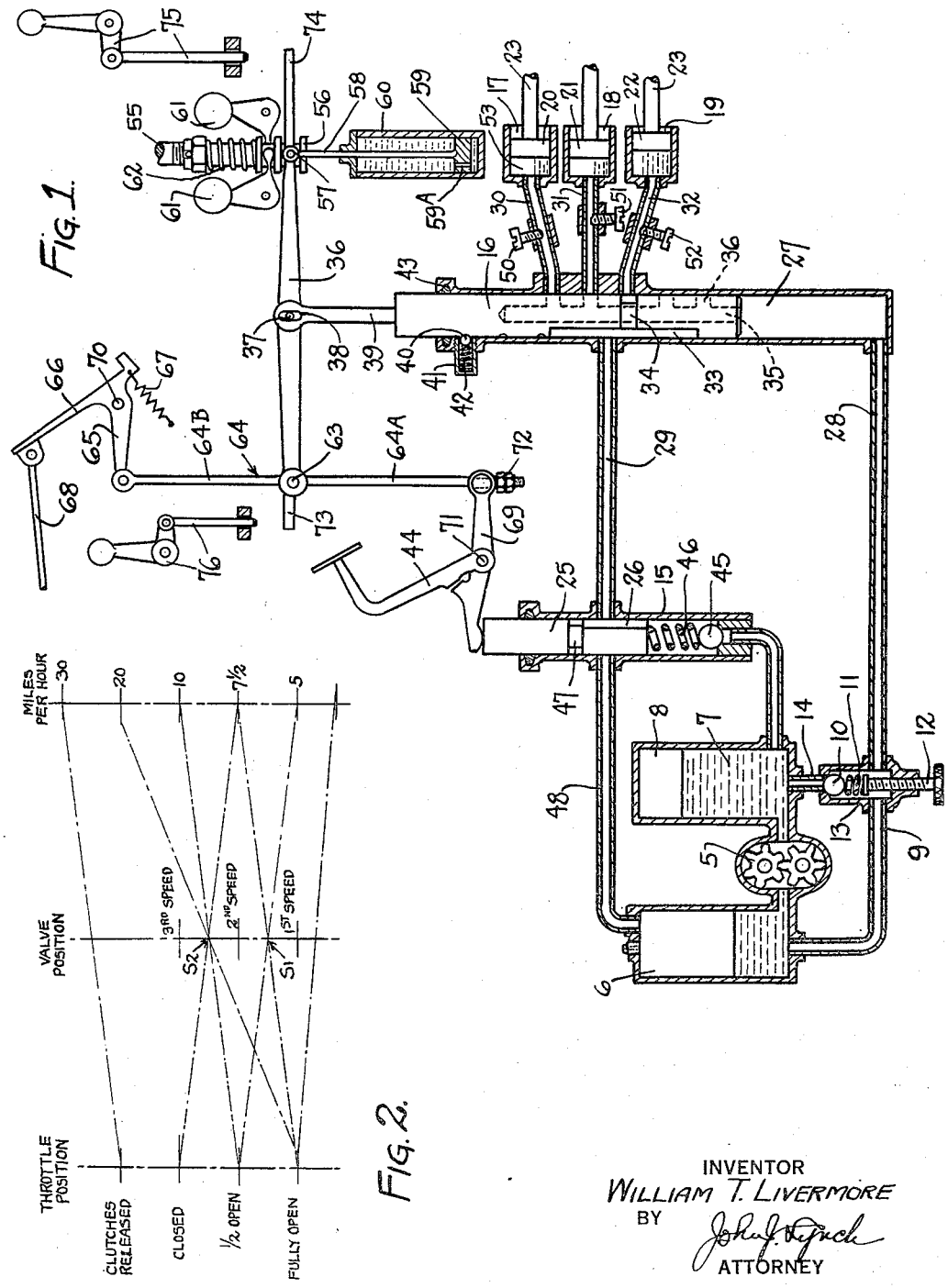

2,120,104

UNITED STATES PATENT OFFICE 2,120,104

AUTOMATIC TRANSMISSION CONTROL

William T. Livermore, Westfield, N. J.

Application April 7, 1932, Serial No. 603,823

20 Claims. (Cl. 74—472)

This invention relates to transmission controls and in particular to a type adapted for use in connection with a drive of an automotive vehicle.

The most important object of my invention is to provide a means for selecting speed ratio, automatically, in accordance with certain combinations of vehicle speed and propelling effort, or in other words, in a vehicle transmission mechanism, to change the speed ratio depending upon the speed of the vehicle and the effort being expended by the engine to propel it, the relation of the speed of the vehicle or the speed of the engine to the propelling effort automatically controlling the shifting of the gears or the operation of clutches or the operation of other means to provide the proper speed ratio for the drive of the car.

Other equally important objects of my invention are to provide means for releasing the driving connection between the engine and the vehicle wheels upon release of the throttle or upon actuation of the throttle, and means being also provided for preventing the throttle from reaching the drive releasing position and also means for controlling actuation of the parts to prevent, permit or shift from high speed drive, as for instance when it is desired to use the engine as a brake when coasting downhill in second gear. Means are also provided for retarding the action of the speed control element and means for altering the action of the speed controlled element to shift at different speeds when the speed is decreasing and increasing.

In applying my improved automatic transmission operating device, reference is made to applications, Serial No. 584,812, filed January 5, 1932, and Serial No. 401,532, filed October 22, 1929, in which are disclosed various forms for hydraulically operating gear ratio mechanism and use is made of a mechanism disclosed in said application to illustrate how the change speed mechanism shifting means or altering means may be operated automatically, the mechanism disclosed in the present application being used to move rods to operate the clutches of an individual clutch transmission or through the medium of suitable forks, to shift gears of a sliding gear transmission.

Changes and variations may be made in the construction shown and described without departing from the principles of the invention or sacrificing its chief advantages; hence such invention is not to be confined to the structures shown in the accompanying drawing; in which, Figure 1 is a view in sectional elevation of a hydraulic operating mechanism used in connection with any type of transmission mechanism used to obtain different speeds in vehicle drives by shifting gears or operating individual clutches in a clutch transmission, Figure 2 is a diagrammatic illustration of the position assumed by the control lever as it is affected by the speed of the car and the position of the throttle.

The purpose of the automatically operated control lever is to automatically select the speed which gives the same combination of speed and torque that a skillful driver would select manually. The device eliminates the human element and will also make the correct selection whereas even a skillful driver many times does not bother to select the proper speed at which to change his gear ratio. With my device, there is obtained exceptional performance such as smoothness of speed changes, uninterrupted power flow and ability of the device to meet the requirements of any driving situation that traffic and road conditions may impose.

Referring to the mechanism disclosed in Figure 1, a gear pump 5 driven in any suitable manner from the engine, draws oil from a supply chamber 6 and pumps it into a pressure chamber 7 in the upper portion of which is provided an air cushion 8. This oil is forced into the pressure chamber at any desired pressure in pounds per square inch and a pressure release valve is provided in a suitable by-path 9, the pressure release valve being indicated by the numeral 10, the same being in the nature of a ball resting on the spring 11, the tension of which is adjustable through the medium of a set screw 12 that has threaded engagement in a housing 13 secured in said by-path 9. The housing is connected through the medium of a suitable nipple 14 with the pressure chamber 7 and the valve ball 10 is arranged to close the passage afforded by the nipple 14 but to yield under excessive pressure in the tank 7. From the pressure chamber the oil flows through the foot clutch valve chamber 15 and the selector valve 16 to the cylinders 17, 18 and 19 in each of which are disposed respectively, the pistons 20, 21 and 22, each of which is provided with its individual piston rod 23 for the operation of clutches of an individual clutch mechanism or for the operation of forks or other means whereby the gears of a sliding gear transmission may be shifted. For the purpose of illustration, it may be assumed that the piston 20 affects the transmission to afford high speed while the operation of the piston 21 affects the transmission to afford second speed and the operation of the piston 22 affects the transmission to afford low speed.

The clutch valve 25 is cylindrical, operates in the valve housing 15 and is provided with the side groove 26 which affords passage of the liquid under pressure to the selector valve 16. The selector valve comprises the casing or chamber 27 which is connected through the medium of the pipe 28 to the fluid supply chamber or reservoir 6. The selector valve chamber 27 is further connected through the medium of the pipe 29 with the clutch valve chamber 25. In this selector valve housing 27, there operates a selector valve plunger 16. Each of the cylinders 17, 18 and 19 are connected through the medium of their respective pipes 30, 31 and 32 with the selector valve chamber 27. The selector valve 16 is provided with the longitudinal groove 33 and the peripheral groove 34, the latter of which is arranged to register with any one of the pipes 30, 31 and 32 depending upon the position of the selector valve 16. The fluid passes through the pipe 29 and into the groove 33 to supply the peripheral groove 34 so that the fluid under pressure may be supplied to any one of the cylinders 17, 18 or 19. The selector valve 16 is further provided with a bore 35 into which opens the discharge passages 36 arranged to coincide with the ends of the pipes 30, 31 and 32 in order to provide for discharge of the liquid under pressure from the cylinders 17, 18 or 19. The oil or liquid thus discharged flows down through the chamber 27 and through the pipe 28 and pipe 9 into the reservoir 6. The position of the selector valve 16 is determined by the position of the control lever 36 that carries, in its mid portion, a pin 37 which engages in the slotted end 38 of an extension 39 connected to the selector valve plunger 16. The plunger in its various adjusted positions is yieldably retained in place through the medium of a ball detent 40 operating against the spring 41 in a suitable housing 42 on the chamber 27, the chamber at its upper end being also provided with an oil packing 43 to prevent leakage of the oil past the selector valve plunger 16.

The clutch valve 25 performs a function similar to that of the ordinary clutch pedal. By pushing the clutch pedal 44 down, the clutch, whichever clutch happens to be engaged (when a clutch transmission is used), is released and by letting the clutch pedal up, the clutch can be gradually engaged. The clutch valve 25 holds a ball valve 45 on its seat by spring pressure, the spring being indicated by the numeral 46 and extending from the ball valve 45 to the under side of the clutch valve 25. This ball valve 45 resists the flow of oil to the selector valve 16. As the clutch valve 25 is raised, the spring pressure is released from the ball and allows the oil pressure in the cylinders 17, 18 or 19 to increase. If the clutch valve 25 is pushed down until the upper groove 47 therein which extends annularly about the valve 25, connects the passage 48 with the passage 29, there will be formed a clear passage from the slot 33 of the selector valve 16 so that the oil may flow out of the cylinders 17, 18 or 19 through the annular groove 34 of the selector valve 16, through the slot 33 therein, through the pipe 29, through the annular groove 47 in the clutch valve 25 and through the pipe 48 back into the reservoir 6. This action will release the clutch. In order that the clutches may be eased in, use is made in the pipes 30, 31 and 32 connecting the selector valve with the respective cylinders of chokes 50, 51 and 52 respectively which are in the nature of set screws that may be threaded into the pipe to block the passage thereof so that the pressure is admitted easily to the cylinders 17, 18 and 19.

In connection with each of the cylinders 17, 18 and 19 and the pistons therein, there is employed, the air cushion 53, the air cushion being provided by the air caught in the cylinders when the oil or other fluid under pressure is forced into the cylinders, this air cushion also providing ease of operation of the clutches and gives the gradual throw-in of the clutch that avoids jarring in starting a vehicle.

At one side of the control lever 36, there is provided a governor shaft 55 driven from the propeller shaft or from any other rotating part in accordance with the speed of the vehicle. The lower end of the governor shaft carries a sliding sleeve 56 to which is pivoted, as at 57, the outer portion of the selector valve control lever 36, there being also pivoted at the same point, the dash pot piston rod 58 which operates the piston 59 within the dash pot 60, the dash pot being of the usual construction and being partly filled with oil so that the leakage of oil from one side of the piston 59 to the opposite side through the hole 59A will afford the proper amount of resistance to permit even operation of the governor. The governor is of the usual fly ball type and consists of the pivoted balls 61 mounted for centrifugal movement in accordance with the speed to raise the collar 56 on the end of the shaft 55 against the tension of the spring 62.

The opposite end of the selector valve control lever 36 is pivoted as at 63 to the ends of the sections 64A and 64B of the throttle rod 64 which depends from a suitable projection 65 on the accelerator pedal 66 which, when actuated against the action of the spring 67, will, through the rod 68, manipulate the throttle in the usual manner. Movement of the accelerator pedal in a counterclockwise direction around its pivot point 70 will open the throttle and also cause a downward movement of the rod 64, as seen in Figure 1, with the result that the pivoted end 63 of the control lever 36 will move downwardly, the relative positions of the throttle opening being noted at the left hand side of the diagrammatic illustration in Figure 2. The lower part 64A of the throttle rod 64 has sliding movement through the clutch lever 69 to which is pivoted, as at 71, the clutch pedal 44, the same being arranged to operate the clutch lever to depress the clutch valve 25 independent of the movement of the throttle rod 64. The lower extremity of the throttle rod 64 is provided with the nut 72 and an upward movement of the throttle rod 64 will cause the clutch valve engaging end of the clutch lever 69 to be forced downwardly about its pivot point 71 to depress the clutch valve 25, the extreme depressed position of the clutch valve being when the annular groove 47 therein is in alignment with the passages 29 and 48 affording a return of the fluid from the operating cylinders to the liquid reservoir. This may be termed the free wheeling position. The selector valve control lever 36 beyond its points of connection with the throttle rod 64 and the governor, is provided with the projections 73 and 74, the latter of which is arranged to be engaged by a pin and lever device 75 which may be manually operated to limit the upward movement of the control lever by the governor when it is desired to use the engine as a brake in the lower speed gear ratios.

The opposite end of the control lever, as indicated by 73 also underlies a similar pin and lever mechanism 76 which is operated to limit the upward movement of the throttle rod 64 and its attached end of the control lever 36 so that free wheeling can be prevented by preventing the accelerator pedal from rising to the free wheeling position.

As illustrated in Figure 1, the control lever 36 is pivoted near its center to the selector valve rod 39 through the medium of a pin and slot connection and at one end to a fly ball governor driven at propeller shaft speed and at its opposite end, to the throttle rod forming a part of the throttle mechanism. In this manner, the control lever is operated by various combinations of throttle opening and propeller shaft speed to move the selector valve to positions which apply the proper gear ratio as is now done by hand.

The accelerator pedal is also connected to the clutch valve 25 through the clutch lever 69 so that when the accelerator is fully released, the pressure is removed from the clutch by depressing valve plunger 25. This provides a free wheeling feature and also the neutral position for the transmission. Thus, to start the car after the engine is running, no motion is required except to step on the accelerator pedal to open the throttle. When the throttle is open, the control or clutch valve 25 releases the pressure on the spring 46 gradually and permits the pressure of oil beneath the control valve 45 to force the same off its seat and build up the pressure in the line gradually in proportion to the throttle opening which ensures smooth clutch application.

Referring to the diagrammatic illustration shown in Figure 2, three scales are employed, the one at the left representing throttle position and the one at the right governor position corresponding to various car speeds and the center scale showing the selector valve position, labelled, First, Second and Third speed, respectively, corresponding to the transmission gear speed. Midway between these points, where the selector valve changes the speed from first to second and third, are the transition points where the gear ratios are changed by the disengagement of one clutch and the engagement of another clutch, these points being designated as S1, S2. The diagonal lines on the diagram represent various positions of the control lever and from these two diagrams, it will be seen that the requirements of all driving conditions can be fully met with my automatic device.

As an example, with the throttle fully open for hill climbing or quick get-away on level ground, in a vehicle used as an example, there are certain car speeds at which gears should be changed to give maximum performance for example, the speed might be changed from first to second at 7½ miles per hour and from second to third at 20 miles per hour. Reference to the diagram in Figure 2, indicates that the transmission will shift at these speeds. A straight edge laid across the diagram with the left end on the point representing full throttle opening and the center on the point midway between first and second speed positions, cuts the right hand line at the 7½ miles per hour point. This is the speed at which shift will occur. If the straight edge with the left end still on the full throttle point, be swung upward representing increase in car speed, it will be seen that it reaches a point midway between second and high gear at 20 miles per hour.

When starting, say, at half throttle on level ground or going down hill or when a maximum acceleration is not desirable, the speed changes should be made at lower car speeds, for instance, the change from first to second speed at 5 miles per hour and from second to third speed at 10 miles per hour. By referring to the diagram, Figure 2, it can be seen that when a straight edge is placed with its left end on the half throttle position and moves at its opposite end up the scale labelled "miles per hour", valve positions noted in the central scale will denote a change of gear from first to second at 5 miles per hour and from second to third at 10 miles per hour.

When driving on level ground it is desirable to remain in high gear even down to car speeds below 10 miles per hour and any mechanism would be most undesirable which would make necessary driving at these low speeds in low gear. An example of this type of condition is when driving behind a slow moving vehicle such as a truck and the car speed must be materially lowered. The transmission should remain in high gear, then, when the road is clear in the opposite direction the accelerator pedal can be stepped upon and the vehicle can pass the truck. Depressing the accelerator in this manner changes the speed from third to second giving maximum acceleration while passing and as the speed of the car increases, the governor changes back to high gear.

Under hill climbing conditions, it is desirable to change to a lower gear when the propelling effort diminishes due to a decrease in the speed of the vehicle. By referring to the diagram in Figure 2, it will be seen that as the car speed decreases with the throttle open, it will change to second speed at 20 miles per hour and if the grade is so great that the car continues to slow down, it would change to first speed at 7½ miles per hour. When the car reaches the top of the grade, the changes are again automatically made back to second and third.

Other considerations in connection with this automatic drive mechanism are, for instance, the reversing which can take place by the use of a small button or lever controlling a reverse sliding gear and which could be mounted on the dash. In order that the throttle may be opened for starting, warming up or testing the engine without starting the car, a hand throttle would be connected to the carburetor independent of the foot throttle in such a way that it does not actuate the control valve.

Free wheeling can be locked out by a lever or other suitable device on the dash which prevents the accelerator from riding to the free wheeling position, this mechanism being indicated by the mechanism 76.

The foregoing examples describe the action of mechanism where the members 36 and 39 are pivoted at a fixed point. The slot 38 is added to provide lost motion between the members 36 and 39 to modify the action of said mechanism so that when the speed of the vehicle is increasing and the selector valve 16 is being raised, shifting will occur at somewhat higher vehicle speed than those at which it will occur when the speed of the vehicle is decreasing and the selector valve is being depressed by the lever 36.

Figure 2, which is a diagrammatic illustration of a part of the mechanism, is drawn without respect to the scale measurement of the mechanism illustrated in Figure 1 and is used simply for the purpose of illustration.

My invention is not to be restricted to the precise details of construction shown since various changes and modifications may be made therein without departing from the scope of the invention or sacrificing the advantages derived from its use.

What I claim is:—

1. The combination with the change speed mechanism of a vehicle of a throttle operator, means for actuating said mechanism to alter the speed of the vehicle, a selector valve in said actuating means, a control member for operating said valve, means operated by the speed of the vehicle for actuating said control member, and a connection from the throttle operator to said control member whereby said control member and valve are moved to various positions to alter the speed of the vehicle in accordance with the position of the throttle and the speed of the vehicle.

2. The combination with the change speed gear mechanism of a vehicle and a throttle control, of means for automatically selecting the gear ratio of the change speed mechanism in accordance with various combinations of vehicle speed and throttle control position, means for releasing a driving connection between the vehicle engine and the vehicle wheels upon release of the throttle control, and means for preventing the throttle control from assuming drive connection releasing position.

3. In an automatically controlled gear ratio mechanism of a type suitable for use on an automotive vehicle having a throttle controlled engine and a propeller shaft, a transmission providing various gear ratio combinations between said engine and said shaft, a movable control member for selectively rendering said gear ratio combinations operable, a throttle control, a governor operatively connected with, and directly responsive to, speed changes of said propeller shaft, and means including a floating lever from said throttle control and said governor to said movable control member for actuating the latter under the differential influence of variations in the speed of the vehicle and the extent of throttle opening.

4. In an automatically controlled gear ratio mechanism of a type suitable for use on an automotive vehicle having a throttle controlled engine and a propeller shaft, a transmission providing various gear ratio combinations between said engine and said shaft, a movable control member for selectively rendering said gear ratio combinations operable, a throttle control, a governor operatively connected with, and directly responsive to, speed changes of said propeller shaft, and connections from said throttle control and said governor to said movable control member for actuating the latter under the differential influence of variations in the speed of the vehicle and the extent of throttle opening, said connections including a lost motion means interposed between said movable member and said governor for causing a change of gear ratio for any given position of said throttle to be made effective at different speeds when the vehicle is accelerating than when the vehicle is decelerating.

5. In an automatically controlled gear ratio mechanism of a type suitable for use on an automotive vehicle having a throttle controlled engine and a propeller shaft, a plurality of fluid pressure operated clutches for rendering various gear ratio combinations operable between said engine and said shaft, a source of fluid pressure, a selector valve interposed between said source of fluid pressure and said clutches, a governor operatively connected with, and directly responsive to, speed changes of said propeller shaft, a throttle control, connections from said throttle control and said governor to said selector valve for actuating the latter under the differential influence of variations in the speed of the vehicle and the extent of throttle opening, and an additional control valve interposed between said source of fluid pressure and said selector valve, and connected to said throttle, for automatically releasing the fluid under pressure in any clutch when said throttle is moved to closed position, thereby to establish free wheeling conditions independently of the operation of said selector valve.

6. In an automatically controlled gear ratio mechanism of a type suitable for use on an automotive vehicle having a throttle controlled engine and a propeller shaft, a plurality of fluid pressure operated clutches for rendering various gear ratio combinations operable, a source of fluid pressure, a selector valve interposed between said source of fluid pressure and said clutches for selectively actuating said clutches, a governor operatively connected with, and directly responsive to, speed changes of said propeller shaft, a throttle control, connections from said throttle control and said governor to said selector valve for actuating the latter under the differential influence of variations in the speed of the vehicle, and the extent of throttle opening, and an additional control valve interposed between said source of fluid pressure and said selector valve and connected to said throttle for automatically releasing the fluid under pressure in any clutch when said throttle is moved to closed position, thereby to establish free wheeling conditions independently of the operation of said selector valve, and manually operable means for preventing the automatic actuation of said additional control valve for preventing free wheeling conditions from being established.

7. In an automatically controlled gear ratio mechanism of a type suitable for use on an automotive vehicle, having a throttle controlled engine and a propeller shaft, a control member for selectively rendering said various gear ratio combinations operable between said engine and said shaft, a governor operatively connected with, and directly responsive to, speed changes of said propeller shaft, and a connection from said control member to said governor, a movable member, the position of which is indicative of the output of the engine at any given speed and a connection from said movable member to said control member to actuate the latter under the combined influence of said governor and said movable member and manually operable means for holding said control member in a desired fixed position uninfluenced by vehicle speed or engine output.

8. In an automatically controlled gear ratio mechanism of a type suitable for use on an automotive vehicle having a throttle controlled engine and a propeller shaft, a transmission providing various gear ratio combinations between said engine and said shaft, a movable control member for selectively rendering said gear ratio combinations operable, a throttle control, a governor operatively connected with, and directly responsive to, speed changes of said propeller shaft, connections from said throttle control and said governor to said movable control member for actuating the latter under the differential influence of variations in the speed of the vehicle and the extent of throttle opening, and an additional control member from said throttle connected in such manner as to disconnect said engine from driving connection with said propeller shaft when said throttle is in closed position.

9. In an automatically controlled gear ratio mechanism of a type suitable for use on an automotive vehicle, having a throttle controlled engine and a wheel propelling shaft, a transmission providing for a variable gear ratio between said engine and said propelling shaft, a movable control member for said transmission to render various gear ratios operable, a throttle control, a governor operatively connected with and directly responsive to speed changes of said propelling shaft, and connections from said throttle control and said governor to said movable control member for actuating the latter under the differential influence of variations in the speed of the vehicle and the extent of throttle opening, said connections including a lost motion means interposed between said movable member and said governor for causing a change of gear ratio, for any given position of said throttle control, to be made effective at different speeds when the vehicle is accelerating than when the vehicle is decelerating.

10. In an automatic change speed gear transmission for automotive vehicles having a propeller shaft, a plurality of fluid pressure operated clutches for rendering various gear ratio combinations operable, a source of fluid pressure, a selector valve interposed between said source of fluid pressure and said clutches, a governor operatively connected with and directly responsive to speed changes of said propeller shaft, a connection from said selector valve to said governor, a movable member the position of which is indicative of the output of the engine at any instant, and a connection from said last named member to said selector valve to actuate the latter under the combined influence of said governor and said last named member.

11. The combination with the change speed gear mechanism of a vehicle and a throttle control, of means for automatically selecting the gear ratio of the change speed mechanism in accordance with various combinations of vehicle speed and degree of throttle opening, and means for releasing a driving connection between the vehicle engine and the vehicle wheels upon release of the throttle control.

12. In an engine driven vehicle transmission mechanism providing for variable gear ratio, a movable control member for said mechanism, automatic actuating means responsive to the propulsive effort of the vehicle to actuate said movable control member, damping means connected to steady the action of said movable control member, and other means coacting with said movable control member to bring said member into a definite predetermined position when said member is brought into the approximate range of said definite predetermined position by said automatic actuating means.

13. In an automatic change speed gear transmission for automotive vehicles, a movable control for selectively rendering various gear ratio combinations operable, a pair of movable members including a throttle and a governor respectively positioned in accordance with engine output and vehicle speed independently of each other, and means actuated by said pair of members and connected with said movable control member for automatically positioning the latter to change the gear ratio under the differential influence of engine output and vehicle speed so arranged that the control member is moved by substantially the same force applied to the throttle irrespective of the position of the governor.

14. In an automatic change speed gear transmission for automotive vehicles, a movable control for selectively rendering various gear ratio combinations operable, a pair of movable members positioned in accordance with engine output and vehicle speed independently of each other, and means actuated by said pair of members and connected with said movable control member for automatically positioning the latter to change the gear ratio under the differential influence of engine output and vehicle speed so arranged that the control member is moved by substantially the same force applied by one of said movable members irrespective of the position of the other.

15. In an automatic change speed gear transmission for automotive vehicles, means for selectively rendering various gear ratio combinations operable, including a pair of movable members respectively positioned in accordance with engine output and vehicle speed independently of each other, a control member for said transmission located between said movable members, a connecting member connected with said control member between said movable members to cause said various gear ratio combinations to be made effective by movement of one of said movable members independently of the other or by the combined movement of said members so arranged that the control member is moved by substantially the same force applied by one of said movable members irrespective of the position of the other.

16. In an automatic change speed gear transmission for automotive vehicles, means for selectively rendering various gear ratio combinations operable, including a pair of movable members respectively positioned in accordance with engine output and vehicle speed independently of each other, a control member for said transmission having a plurality of predetermined positions in each of which a predetermined gear ratio is made effective, and connections between said movable members and control member to cause said control member to be actuated to said predetermined positions by a combined variable action of said movable members through definite ranges of movements, said connections so arranged that the control member is moved by substantially the same force applied by one of said movable members irrespective of the position of the other, movement of each of said movable members through a certain definite range varying the range of movement of the other in which a predetermined gear ratio is made effective.

17. The combination with a variable ratio transmission for a vehicle having a throttle controlled engine, of means for automatically selecting the ratio of the transmission in accordance with various combinations of vehicle speed and throttle control position, means for releasing a driving connection between the vehicle engine and the vehicle wheels upon release of the throttle control, and means for optionally preventing the release of the throttle from causing the release of said driving connection.

18. The combination with a variable ratio transmission for a vehicle having a throttle controlled engine, of means for automatically selecting the ratio of the transmission in accordance with various combinations of vehicle speed and throttle control position, means for releasing a driving connection between the vehicle engine and the vehicle wheels upon release of the throttle control, and means for preventing the throttle control from assuming driving connection releasing position.

19. In an automatic change speed transmission for automotive vehicles, a movable control for rendering various gear ratio combinations operable, a pair of movable members including a throttle and a governor having its position determined solely by vehicle speed, and means actuated by said pair of members and connected with said movable control member for automatically positioning the latter to change the gear ratio under the differential influence of engine output and vehicle speed.

20. The combination with the change speed gear mechanism of a vehicle and a throttle control, of means including a control means for automatically selecting the gear ratio of the change speed mechanism in accordance with various combinations of vehicle speed and throttle control position, and means for altering the action of said control means to afford automatic selection of the gear ratio at different vehicle speeds when the vehicle is accelerating than when decelerating for any given position of said throttle control.

WILLIAM T. LIVERMORE.